Figure 1:
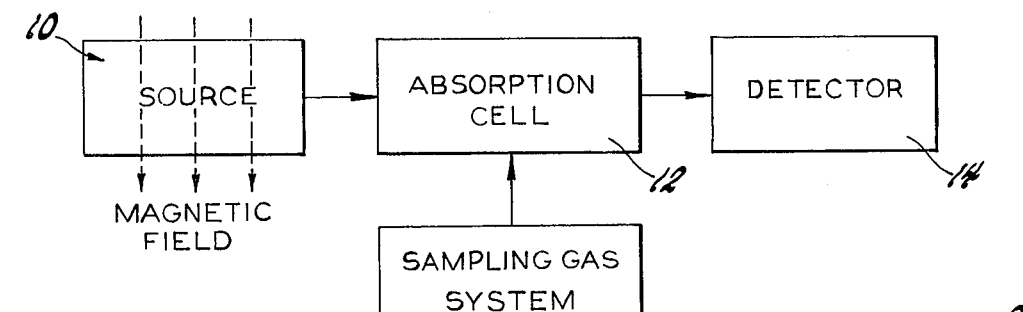

United States Patent [19]
Kikuchi

[11] 3,884,583
[45] May 20, 1975

[54] METHOD AND APPARATUS FOR MAGNETICALLY MODULATED RESONANCE ANALYSIS OF GAS

[75] Inventor: Tom T. Kikuchi, Santa Barbara, Calif.

[73] Assignee: General Motors Corporation, Detroit, Mich.

[22] Filed: May 3, 1973

[21] Appl. No.: 357,017

[52] U.S. Cl. .................. 356/201; 250/343; 356/51; 356/85; 356/97
[51] Int. Cl. ...................... G01n 21/22; G01n 21/34
[58] Field of Search ........... 356/51, 85, 87, 97, 201; 359/96; 250/343

[56] References Cited
UNITED STATES PATENTS
3,449,565   6/1969   Barringer .............................. 356/51
3,676,004   7/1972   Prugger et al. ........................ 356/87

Primary Examiner—Vincent P. McGraw
Attorney, Agent, or Firm—Warren D. Hill

[57] ABSTRACT

An ultra-violet resonance absorption gaseous analyzer includes a radiation source comprising the gaseous specie being analyzed and means for exciting the gas to cause emission of spectral lines in resonance with the specie being analyzed. A varying magnetic field applied to the source effects Zeeman splitting of the spectral lines. The use of an AC magnetic field alone causes scanning of the peak of the absorption curve of the specie being analyzed to effect a second harmonic amplitude modulation of the radiation transmitted through the gas or scattered therefrom. By applying a combined DC and AC magnetic field to the source, the Zeeman shifted spectral lines are caused to scan the sides of the absorption curve to cause first harmonic amplitude modulation of the transmitted or scattered radiation.

4 Claims, 5 Drawing Figures

PATENTED MAY 20 1975 3,884,583

METHOD AND APPARATUS FOR MAGNETICALLY MODULATED RESONANCE ANALYSIS OF GAS

The invention herein described was made in the course of work under a contract or subcontract thereunder with the Department of Defense.

This invention relates to a method and apparatus for measuring the concentration of a gaseous specie in a sample by resonance analysis techniques wherein magnetic modulation of the source radiation is utilized.

There is a need for a low-cost, reliable, high sensitivity, safe and easily-operable detector for analyzing gases such as nitric oxide. For example, monitoring of automotive exhausts emission requires examination of nitric oxide as well as sulfur dioxide and ammonia. Prior devices generally are expensive and suffer from low sensitivity, the requirement of moving parts, the need for operation at very low pressures, high sensitivity to background interferences or long response times.

It is therefore an object of this invention to provide a method and apparatus for analyzing gas which is relatively inexpensive and has high sensitivity, no moving parts and low sensitivity to background interferences.

It is a further object to provide such a method and apparatus which is operable at ambient pressure and has a fast response time.

The invention is carried out by providing a cell containing the gaseous sample to be analyzed, a radiation source for directing into the cell radiation lines in resonance with the gas specie to be measured and a detector for sensing the light transmitted through or scattered from the sample gas, and includes the method and apparatus for applying a varying magnetic field to the radiation source to effect Zeeman splitting of the radiation lines. The radiation source is thus frequency modulated to scan the absorption curve of the gas being measured such that the light emitted from (scattered from or transmitted through) the sample cell is amplitude modulated to an extent determined by the gas concentration. In one embodiment of the invention, the magnetic field is AC only such that the peaks of the absorption curves are scanned by the Zeeman shifting of radiation to provide second harmonic amplitude modulation of the radiation output of the sample cell, while in another embodiment, the magnetic field has a DC bias with a superimposed AC component such that the modulated source radiation scans the sides of the absorption curve to produce a first harmonic amplitude modulation of the radiation output of the sample cell.

Figure 2:
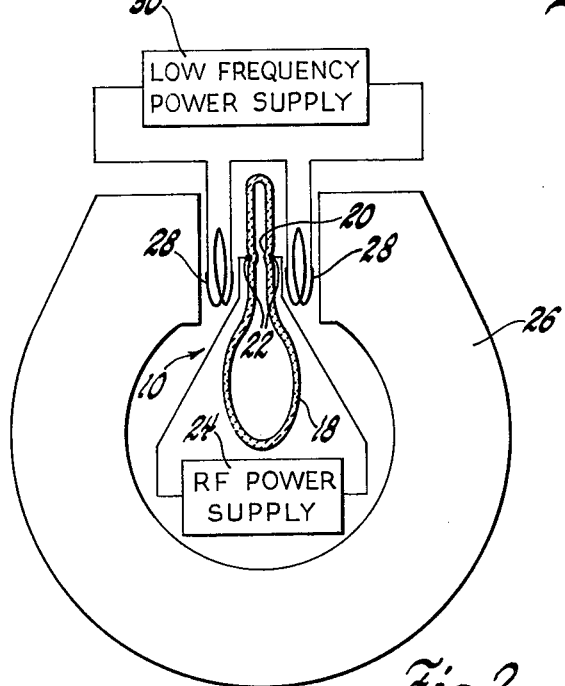
Figure 4:
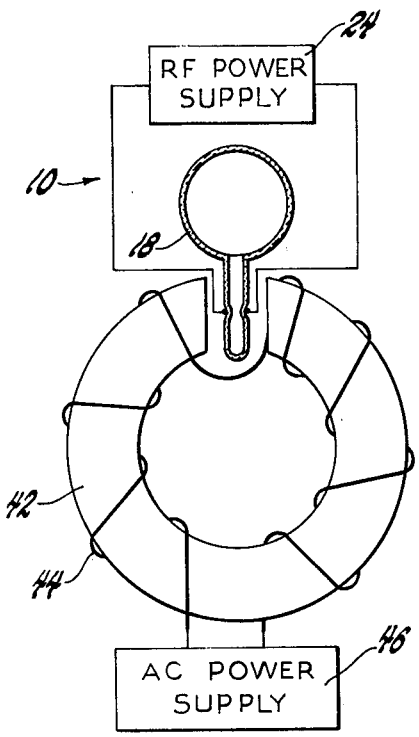
Figure 3:
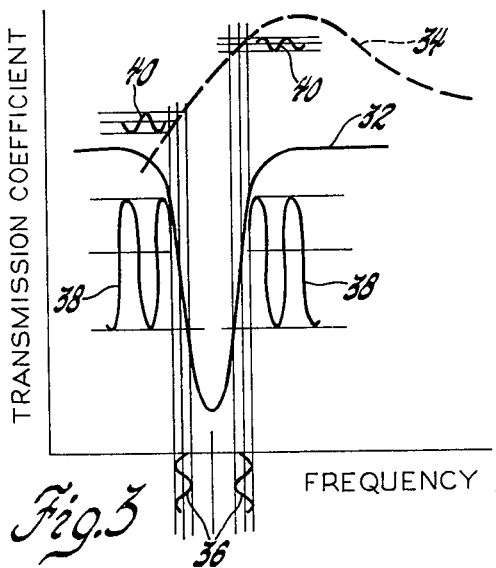
Figure 5:
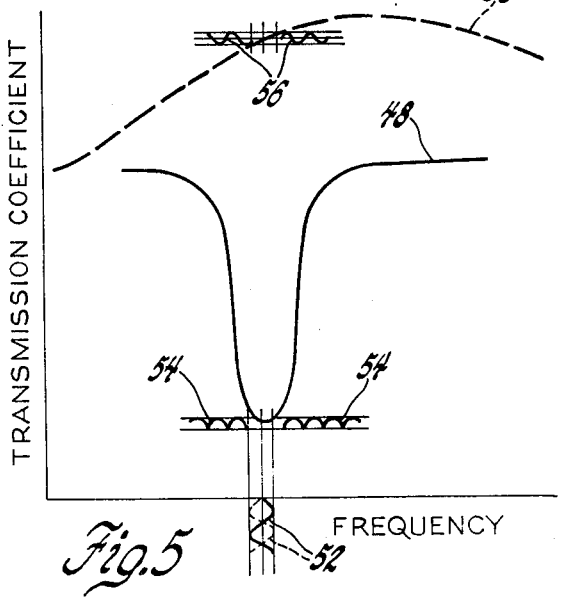

The above and other advantages will be made more apparent from the following specification taken in conjunction with the accompanying drawings wherein like reference numerals refer to like parts and wherein:

FIG. 1 is a block diagram of a resonance absorption gaseous analyzer according to the invention, FIG. 2 is a schematic illustration of a radiation source and associated magnetic field generating apparatus according to one embodiment of the invention, FIG. 3 is a diagram illustrating the interaction of the source radiation with the gas being measured in the embodiment of FIG. 2, FIG. 4 is a schematic view of a radiation source, and a magnetic field generating apparatus according to another embodiment of the invention, and FIG. 5 is a diagram illustrating the interaction of the source radiation with the gas being measured in the embodiment of FIG. 4.

As shown in FIG. 1 the resonance absorption technique utilizes a source of UV line radiation 10, an absorption cell 12 subject to the radiation from the source 10 and which contains a sample of the gas being analyzed, and a detector 14 for measuring the radiation transmitted through or scattered from the absorption cell 12. The detector 14 consists of a monochromator or a bandpass interference filter followed by a photomultiplier or phototransistor for radiation sensing along with an electrometer recorder to provide information readout. The invention operates on all UV lines of the gas being analyzed so that the detection scheme is not critical and only inexpensive broad band detection apparatus is required. A sampling gas system 16 collects the gas to be analyzed and feeds it to the absorption cell 12. The system as thus far described is well known in the art and detailed elaboration is considered to be unnecessary. A feature of FIG. 1 which is not conventional is the magnetic field applied to the source 10 for effecting Zeeman splitting of the source radiation lines, the magnetic field being variable to cause frequency modulation of the radiation lines to effect scanning of the absorption curve of the gaseous specie being measured.

While the embodiments of the invention disclosed herein are described in terms of use of ultra-violet radiation for measuring the concentration of NO, the principle of the invention is applicable to infra-red and other spectra and may be applied to the measurement of any paramagnetic gas. In addition the invention is not limited to the detection of radiation transmitted through the gaseous sample, but also extends to the measurement of radiation scattered from the sample.

An obstacle to accurate measurement of NO has been background interference resulting from absorption from gases other than NO. Such background interference can be large and also can vary widely. According to this invention, Zeeman field scanning is used to minimize or eliminate the affects of background interference thereby increasing the accuracy of measurement. Other background interference due to instrument instability is also minimized by this invention.

Although not limited thereto, it is preferred that the radiation source 10 comprise an excited gas sample of the same specie as that being analyzed. Thus where the gas to be measured is NO, an NO source is utilized to insure that the source spectrum is fundamentally in coincidence with the NO absorption spectrum. A scanning of the NO absorption is carried out by modulating the NO source spectrum with a magnetic field. With the application of a magnetic field, the transmission through the absorption cell 12 varies depending on where the spectral position of the source radiation system lies with respect to the absorption spectrum being scanned. The frequency shifted source radiation is passed through the gas to sample the various portions of the absorption spectrum. The radiation other than the radiations of NO in the source will be unaffected or only slightly affected by the gaseous sample constituents. Thus from the change in the absorption due to changes of the magnetic field, the NO concentration can be extracted in the presence of background interference.

There are three modes of applying the Zeeman scanning technique. First, a slowly varying magnetic field applied to the source radiation alternatively places the source spectrum "in" resonance and "off" resonance with the NO in the absorption cell 12. When the radiation is in line with the absorbing NO then the absorption depends on the NO absorption and the background. With the application of the magnetic field, the perpendicular component of the source radiation is completely removed from the center of the absorption — then the absorption will depend only on the background. The difference of the absorption in the two cases will give the contribution of the NO only. This technique provides large signals but requires magnetic field variations from zero to 20,000 gauss and can be carried out only at a slow rate and then with the use of a large electromagnet and a large power supply.

In the second mode of applying this technique, the magnetic field with a DC bias and a superimposed AC field modulation is used. With reference to FIG. 2, a radiation source 10 comprises a quartz capsule 18 containing $N_2$ and $O_2$ comprises a bulbous portion and an elongated neck portion having a reduced collar 20. A pair of opposed electrodes 22 at the collar 20 are connected to an RF power supply 24 to supply an exciting field to form NO and to effect emission of UV radiation from the NO gas. The ratio of $N_2$ and $O_2$ in the source and the gas pressure in the capsule 18 are not critical. A pressure of 4 to 10 Torr has been found to be satisfactory in a gas mixture of 20 parts of $N_2$ to 1 part of $O_2$. Alternate sources of excitation may be a pair of parallel plates outside the collar 22 connected to the power supply 24, or a source of microwave energy connected to the capsule 18 by an open tapered rectangular waveguide, the capsule being disposed within the narrow termination portion of the waveguide, so that the microwave radiation excites the gas within the capsule.

While a large number of lines in the source radiation are operative to produce the ultimate absorption signal, the present description will, for convenience, be directed to one typical line and its interaction with the gaseous specie being measured.

A practical DC magnetic field across the radiation source can be provided by a permanent magnet 26 having its poles disposed on opposite sides of the source, while the AC magnetic field is supplied by a pair of modulation coils 28 connected to a low frequency power supply 30. In principle, the maximum sensitivity is attained when the DC magnetic field places the peaks of a split source radiation at the inflection points of the absorption spectrum as shown in FIG. 3. In reality, only one component of the split radiation will be placed at each inflection point, while others will be located on another portion of the spectrum.

FIG. 3 illustrates one peak of the NO absorption of the NO absorption spectrum 32 plotted as transmission coefficient versus radiation frequency. The absorption peak is reflected as a minimum in the figure since the graph is based on transmission through the sample as a measure of absorption. Accordingly, the minimum shall be referred to herein as the peak. The background absorption due to other gases in the sample is depicted as a broken line 34. Normally in the absence of a magnetic field, the frequency of the source radiation line occurs at the peak of the absorption curve 32. The Zeeman splitting resulting from the DC magnetic field provides two lines 36 180° out of phase located on opposite sides of the absorption curve 32 centered at the inflection points which are modulated by the AC magnetic field to provide scanning along the sides of the absorption curve. The resulting amplitude modulation signals 38 of the radiation passing from the absorption cell are in phase and therefore additive. Thus for the AC modulation superimposed on the DC field, the absorption curve acts as a discriminator and the frequency modulated source radiation is then converted to amplitude modulation when NO is present. In the absence of NO, there will be no amplitude modulated signal. The higher the concentration of NO, the steeper will be the slope of the absorption curve and consequently, the detected AC component will be correspondingly higher. For a linear variation of the background absorption across the narrow width of the NO absorption line, the signals 40 associated with the background will be 180° out of phase and will cancel out.

The third mode of Zeeman modulation involves an AC magnetic field modulation with no DC bias. This is carried out by the apparatus shown in FIG. 4 which includes a source 10 like that of FIG. 2, and a magnetic field across the source produced in the gap of a ferromagnetic core 42 supplied with a field winding 44 which is connected to an AC power supply 46 having a frequency of say, 1000 Hz. For a gap of one inch, a 113 turn winding 44 supplied with 15 ampere current will supply an appropriate field.

FIG. 5 illustrates the operation of the embodiment of FIG. 4. The absorption curve for NO is represented by the solid line 48 and that for other gases is represented by the broken line 50. The solid and broken lines 52 represent the AC modulated source radiation, there being two lines 180° out of phase due to the Zeeman splitting. In reality, there will be more than two Zeeman components of rotational lines for scanning the peak of the absorption curve which can be utilized to give higher sensitivity. As the lines 52 scan the peak of the NO absorption curve, the source radiation is converted into second harmonic amplitude modulated signals 54 which are additive. The effect of this same scanning taking place on the absorption curve 50 of other gases in the sample provides a pair of signals 56 which are 180° out of phase and which will therefore cancel if the curve 50 is linear, which is highly probably for the very small region being scanned. Thus the amplitude modulated second harmonic signal 54 is representative only of the NO component of the sample gas and will vary according to the concentration of NO since the absorption curve flattens for smaller concentrations to provide smaller signals 54.

It should be noted that the modulated radiation emitted from the absorption cell 12 and measured by the detector 14 may be radiation transmitted through the cell from the source 10 or radiation scattered from the NO in the cell, either type of radiation carrying the same modulation signal.

The measurement of NO in concentrations as low as one part per million or less in a gaseous sample at atmospheric pressure can be accomplished according to the method and apparatus of this invention. The device requires no moving parts such as a mechanical chopping wheel and has low sensitivity to ambient changes and to background interferences.

The embodiment of the invention described herein is for purposes of illustration and the scope of the invention is intended to be limited only by the following claims:

It is claimed:

1. A resonance absorption analyzer for measuring the concentration of a predetermined gaseous specie in a sample comprising
   a line source of radiation fundamentally in resonance with the specie being measured including a quantity of gas of the predetermined specie and means for exciting the gas to produce radiation,
   means for directing the radiation through the sample for partial absorption thereby,
   means for detecting the radiation emitted from the sample,
   and means for producing second harmonic amplitude modulation of the emitted radiation including means for frequency modulating the source radiation for scanning the peak of the absorption curve of the specie being measured comprising means for establishing an AC magnetic field only across the source sufficient to produce modulated Zeeman splitting of the source radiation whereby second harmonic amplitude modulation of the emitted radiation occurs, the degree of amplitude modulation depending on the concentration of the predetermined specie in the sample.

2. A resonance absorption analyzer for measuring the concentration of a predetermined gaseous specie in a sample comprising
   a line source of radiation fundamentally in resonance with the specie being measured including a quantity of gas of the predetermined specie and means for exciting the gas to produce radiation,
   means for directing the radiation through the sample for partial absorption thereby,
   means for detecting the radiation emitted from the sample,
   and means for frequency modulating the source radiation for scanning the sides of the absorption curve of the specie being measured including means for establishing a DC magnetic field across the source sufficient to effect Zeeman splitting of the source radiation to provide radiation frequencies coincident with the sides of the absorption curve and for superimposing an AC magnetic field across the source to effect scanning of the source radiation along the sides of the absorption curve whereby amplitude modulation of the emitted radiation occurs, the degree of modulation depending on the concentration of the predetermined specie in the sample.

3. The method of measuring the concentration of a gaseous specie by a resonance absorption technique comprising the steps of
   providing an absorption cell containing the gaseous specie to be measured, a line source of radiation fundamentally in resonance with the specie being measured, and a detector for measuring radiation emitted from the absorption cell,
   and effecting second harmonic amplitude modulation of the emitted radiation by modulating the frequency of the source radiation to scan the peak of the absorption curve of the specie being measured by applying an AC magnetic field to the radiation source to effect varying Zeeman splitting of the source radiation thereby modulating the emitted radiation measured by the detector as a second harmonic of the magnetic field frequency, the degree of modulation being dependent on the concentration of the specie being measured.

4. The method of measuring the concentration of a gaseous specie by a resonance absorption technique comprising the steps of
   providing an absorption cell containing the gaseous specie to be measured, a line source of radiation fundamentally in resonance with the specie being measured, and a detector for measuring radiation emitted from the absorption cell,
   modulating the frequency of the source radiation to scan the sides of the absorption curve of the species being measured by applying a DC magnetic field to the radiation source to effect Zeeman splitting of the source radiation to provide radiation frequencies coincident with the sides of the absorption curve, and applying a superimposed AC magnetic field to the radiation source to effect modulation of the source radiation to scan the sides of the absorption curve thereby modulating the emitted radiation measured by the detector, the degree of modulation being dependent on the concentration of the specie being measured.

* * * * *